(12) United States Patent
Neet et al.

(10) Patent No.: US 11,081,943 B2
(45) Date of Patent: Aug. 3, 2021

(54) DISTRIBUTED STATOR WINDING

(71) Applicant: BorgWarner Inc., Auburn Hills, MI (US)

(72) Inventors: Kirk Neet, Pendleton, IN (US); Stephen Humphrey, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 242 days.

(21) Appl. No.: 16/265,108

(22) Filed: Feb. 1, 2019

(65) Prior Publication Data

US 2020/0028417 A1   Jan. 23, 2020

Related U.S. Application Data

(60) Provisional application No. 62/625,232, filed on Feb. 1, 2018.

(51) Int. Cl.
  *H02K 15/00*   (2006.01)
  *H02K 15/04*   (2006.01)
  (Continued)

(52) U.S. Cl.
  CPC .......... *H02K 15/0478* (2013.01); *H02K 1/16* (2013.01); *H02K 3/28* (2013.01); *Y10T 29/49009* (2015.01)

(58) Field of Classification Search
  CPC .......... H02K 3/28; H02K 19/12; H02K 19/22; H02K 3/04; H02K 17/12; H02K 1/16; Y10T 29/49009
  (Continued)

(56) References Cited

U.S. PATENT DOCUMENTS 6,901,649 B2 * 6/2005 Imori ................ H02K 3/14
                                                    29/596
7,703,192 B2 * 4/2010 Sadiku ............. H02K 15/0478
                                                    29/596
(Continued)

FOREIGN PATENT DOCUMENTS

CN    106787337 A    5/2017
JP    H1198786 A     4/1999
(Continued)

OTHER PUBLICATIONS

International Search Report and Written Opinion for International Applciation No. PCT/US2019/045949; International Filing Date Aug. 9, 2019; Report dated Nov. 28, 2019 (pp. 1-9).
(Continued)

*Primary Examiner* — Thiem D Phan
(74) *Attorney, Agent, or Firm* — Cantor Colburn LLP

(57) ABSTRACT

A method of forming a stator for an electric machine includes forming a first conductor and a second conductor into a plurality of bends having a first winding pitch, creating a winding layer by introducing the first conductor and the second conductor into a first pole of a stator with the second conductor being on top of the first conductor at a first end loop crossing zone. The winding pitch of the first conductor is changed to a second winding pitch and the winding pitch of the second conductor is changed to a third winding pitch. The first conductor is woven relative to the second conductor between the first pole and a second pole. The first conductor and the second conductor are introduced into the second pole of the stator with the first conductor being on top of the second conductor at a second end loop crossing zone.

19 Claims, 5 Drawing Sheets

(51) Int. Cl.
*H02K 1/16* (2006.01)
*H02K 3/28* (2006.01)

(58) Field of Classification Search
USPC .................. 29/596, 598, 605, 606, 732, 736
See application file for complete search history.

(56) References Cited

U.S. PATENT DOCUMENTS

| | | |
|---|---|---|
| 7,952,245 B2 | 5/2011 | Ueda et al. |
| 8,832,928 B2 | 9/2014 | Akimoto et al. |
| 2006/0163959 A1 | 7/2006 | Ogawa et al. |
| 2010/0231082 A1 | 9/2010 | Bodin et al. |
| 2014/0042865 A1 | 2/2014 | Mourou et al. |
| 2014/0252908 A1 | 9/2014 | Sadiku et al. |
| 2014/0354095 A1 | 12/2014 | Ishikawa et al. |
| 2015/0054374 A1 | 2/2015 | Neet |
| 2017/0229936 A1 | 8/2017 | Kang et al. |
| 2020/0052537 A1 | 2/2020 | Yoon |
| 2020/0052561 A1 | 2/2020 | Neet |
| 2020/0052562 A1 | 2/2020 | Neet |

FOREIGN PATENT DOCUMENTS

| | | |
|---|---|---|
| JP | 2004023808 A | 1/2004 |
| JP | 2009148147 A | 7/2009 |

OTHER PUBLICATIONS

International Search Report and Written Opinion for International Application No. PCT/US2019/045947; International Filing Date Aug. 9, 2019; Report dated Nov. 28, 2019 (pp. 1-8).
International Search Report and Written Opinion for International Application No. PCT/US2019/045967; International Filing Date Aug. 9, 2019; Report dated Dec. 5, 2019 (pp. 1-8).
International Search Report and Written Opinion for International Application No. PCT/US2019/016243; International Filing Date Feb. 1, 2019; Report dated May 17, 2019 (pp. 1-8).

* cited by examiner

FIG. 2A

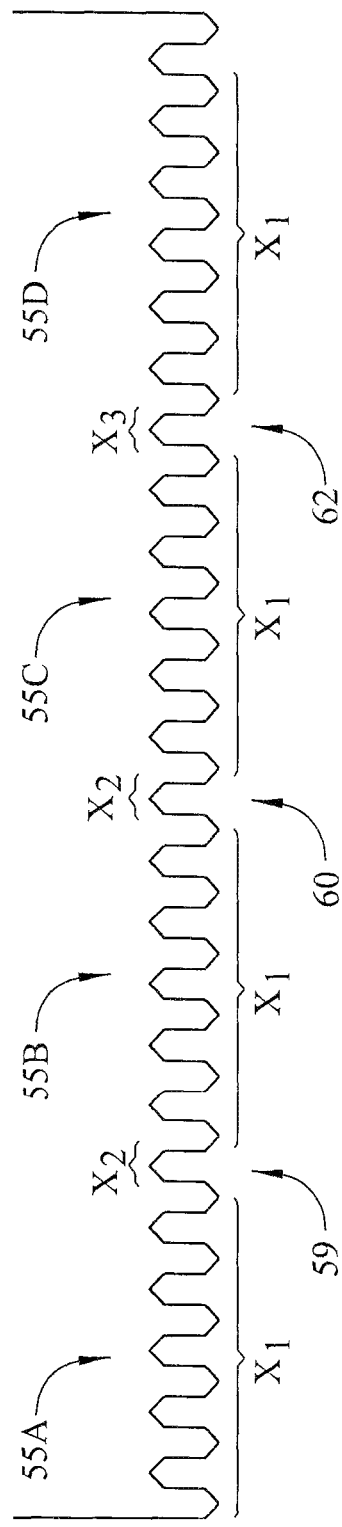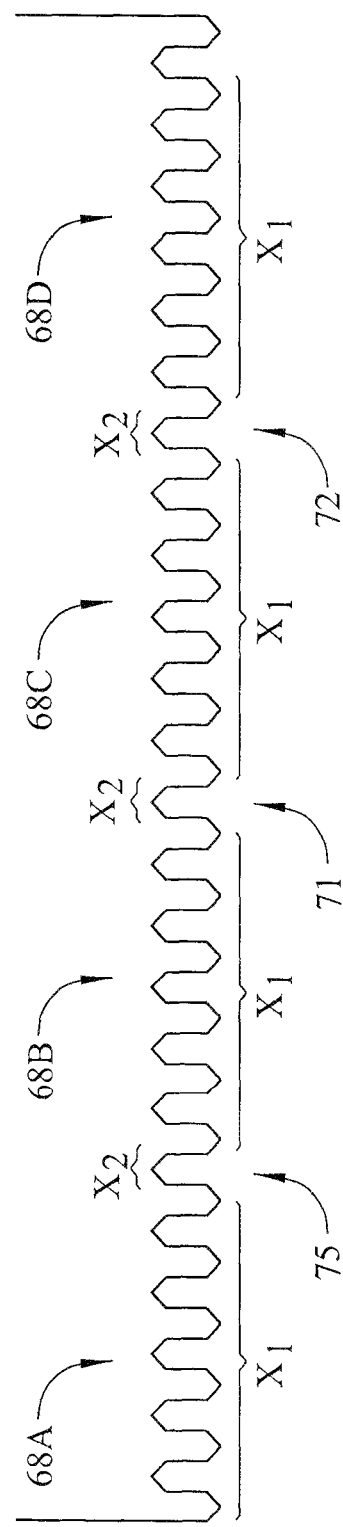
FIG. 3A
FIG. 3B

DISTRIBUTED STATOR WINDING

CROSS REFERENCE TO RELATED APPLICATIONS

This application claims priority to U.S. Provisional Application No. 62/625,232, filed on Feb. 1, 2018, the disclosure of which is incorporated herein by reference.

BACKGROUND OF THE INVENTION

Exemplary embodiments pertain to the art of electric machines and, more particularly, to an electric machine having a distributed winding.

The stator of an electrical motor or generator includes of two parts and insulation material. The first part is the lamination. A lamination is typically formed of laminated sheets of electrical steel that is formed (stamped, rolled or bent) into an annulus shape having an ID, an OD and a stack height. The lamination further includes slots open to the ID or OD. The slots have a width and a depth. In between each slot is a lamination tooth that extends from the ID or OD lamination back iron (yoke).

The second part is the winding. The winding is typically formed of insulated copper wire. It should be understood however, other conductive materials, such as aluminum, might be used. The winding includes a number of phases—typically 3, 5 or 6. The number of phases may vary. For each phase the winding includes conductors having slot segments and end loops. The slot segments are housed in the lamination slots. The end loops span mostly circumferentially and connect two slot segments together. The winding may be a delta winding or a wye winding.

A distributed winding is a winding that has poles of one phase that include more than one slot, typically adjacent slots. For example, in a 3 phase winding, slot segments associated with phase U are housed in slots 1 and 2; slot segments associated with phase V are housed in slots 3 and 4; and slot segments associated with phase W are housed in slots 5 and 6. Slot segments associated with, phase U are again housed in slots 7 and 8 and so forth. A short pitched winding or phase shifted winding will have each pole of each phase having certain slots that house slot segments on one phase and slot segments of another phase.

BRIEF DESCRIPTION OF THE INVENTION

Disclosed is a method of forming a stator for an electric machine including forming a first conductor into a plurality of bends having a first winding pitch, forming a second conductor into a plurality of bends having the first winding pitch, creating a winding layer of the stator by introducing the first conductor and the second conductor into a first pole of a stator having a first end loop crossing zone. The second conductor is on top of the first conductor at the first end loop crossing zone. The winding pitch of the first conductor is changed to a second winding pitch that is distinct from the first winding pitch, and a winding pitch of the second conductor is changed to a third winding pitch that is distinct from the first winding pitch and the second winding pitch. The method further includes weaving the first conductor relative to the second conductor between the first pole and a second pole of the stator, and introducing the first conductor and the second conductor into the second pole of the stator having a second end loop crossing zone, wherein the first conductor is on top of the second conductor at the second end loop crossing zone.

BRIEF DESCRIPTION OF THE DRAWINGS

The following descriptions should not be considered limiting in any way. With reference to the accompanying drawings, like elements are numbered alike:

FIG. 2a depicts a first portion of a chart illustrating a winding recipe for eight (8) conductors of the distributed winding of FIG. 1, in accordance with an exemplary embodiment;

FIG. 3a depicts a conductor of the distributed winding of FIG. 1, in accordance with an aspect of an exemplary embodiment;

FIG. 3b depicts another conductor of the distributed winding of FIG. 1, in accordance with an aspect of an exemplary embodiment.

DETAILED DESCRIPTION OF THE INVENTION

A detailed description of one or more embodiments of the disclosed apparatus and method are presented herein by way of exemplification and not limitation with reference to the Figures.

Figure 1:
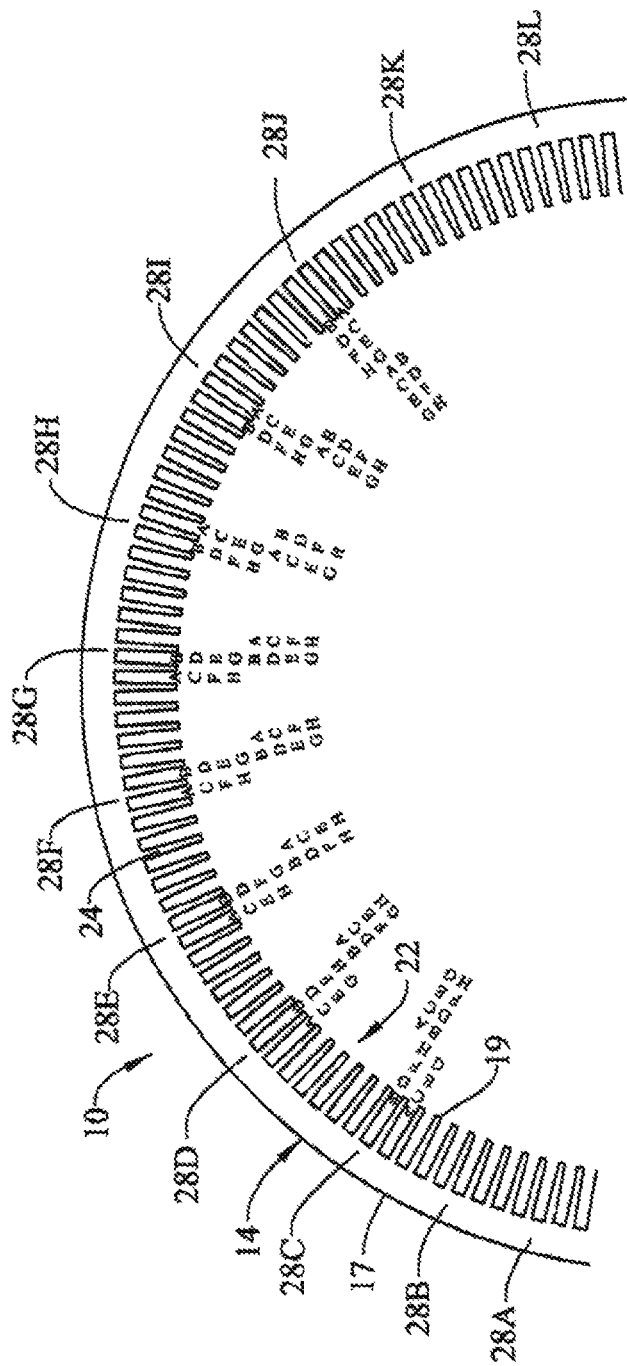
FIG. 1 depicts a partial view of a stator for an electric machine including a distributed winding, in accordance with an aspect of an exemplary embodiment.

A stator for an electric machine is indicated generally at 10 in FIG. 1. Stator 10 includes a stator body 14 having an outer surface 17 defining an outer diameter (OD) and an inner surface 19 defining an inner diameter (ID). Stator 10 includes a plurality of slots indicated generally at 22 defined by radially inwardly projecting teeth indicated generally at 24. Stator slots 22 define a plurality of poles 28a-28l. The number of poles may vary.

Figure 2A:
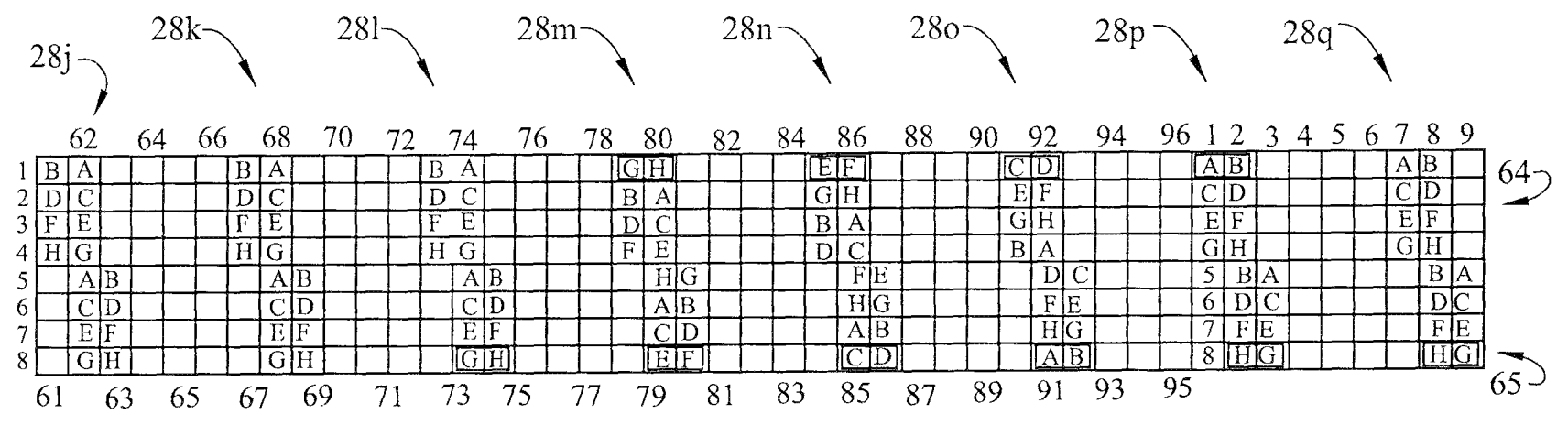
Figure 2B:
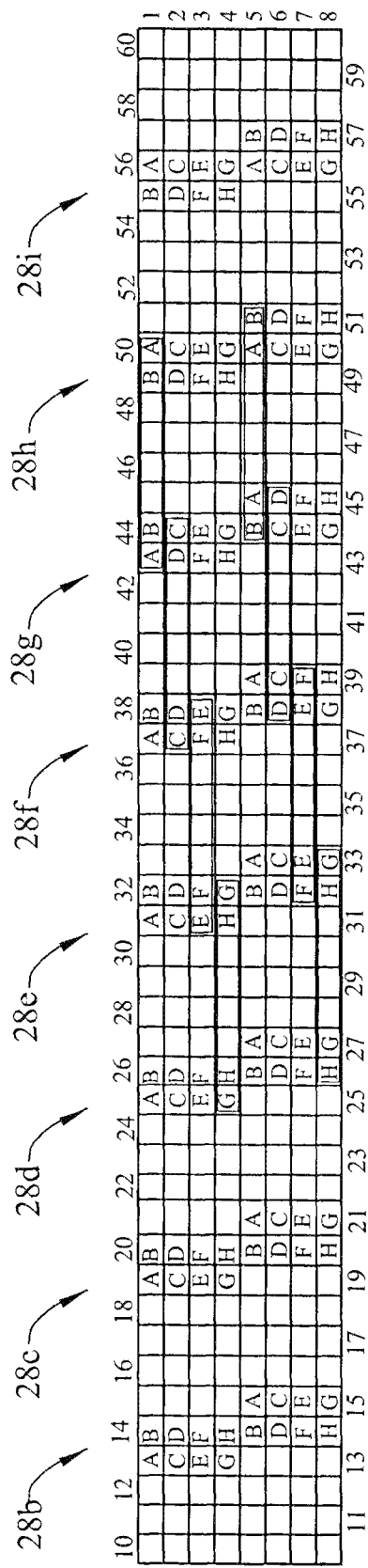
FIG. 2b depicts a second portion of a chart illustrating a winding recipe for eight (8) conductors of the distributed winding of FIG. 1, in accordance with an exemplary embodiment.

At least one phase winding including a plurality of conductors 31 is arranged in each pole 28a-28l. The number of phase windings supported by stator 10 may vary. Further, may the number of conductors for each phase may also vary. In the embodiment shown, stator 10 includes eight (8) conductors for a particular phase winding. Conductor A, conductor B, conductor C, conductor D, conductor E, conductor F, conductor G, and conductor H. FIG. 2a and FIG. 2b depict an exemplary arrangement of a slot segments for a single phase defined by conductors A-H in in select ones of slots 22 so as to define sixteen (16) poles of stator 10 in accordance with an exemplary embodiment.

Layers are shown as 1-8, with layer 1 being the outermost radial layer and layer 8 being the innermost radial layer. Not shown in FIG. 2 are end loops that connect one slot segment to another slot segment of the same letter in an adjacent pole. For example, an end loop connects the slot segment of conductor A of pole 28j to the slot segment of conductor A in the same layer of pole 28k. The conductors of the second phase (not separately labeled) and third phase (also not separately labeled) are the same as the A-H conductors of the first phase. The conductors of the second phase of FIG. 2 would be inserted into the empty slots shifted two slots from conductors of the first phase and conductors of the third phase of FIG. 2 would be inserted into the empty slots shifted four slots to the left of conductors of the first phase.

With continued reference to FIG. 2, a conductor A starts as a lead in pole 28p and extends through the stator slot 1 as a slot segment in layer 1 of pole 28p. An end loop (not shown) having a pitch N extends from the slot segment in slot 1 to the right and connects to a slot segment of conductor A residing in layer 1 of slot 7 of pole 28a. Another end loop (also not shown) having a pitch N (not shown) extends from the slot segment in slot 7 to the right and connects to a slot segment of conductor A residing in layer 1 of slot 13 of pole 28b. Conductor B starts as a lead in pole 28p and extends through the stator slot 2 as a slot segment in layer 1 of pole 28p (slot 2). An end loop having a pitch of 6 or N (not shown) extends from the slot segment in slot 2 to the right and connects to a slot segment of conductor B residing in layer 1 of slot 8 of pole 28a. Another end loop having a pitch N (not shown) extends from the slot segment in slot 8 to the right and connects to a slot segment of conductor B residing in layer 1 of slot 14 of pole 28b.

Figure 4:
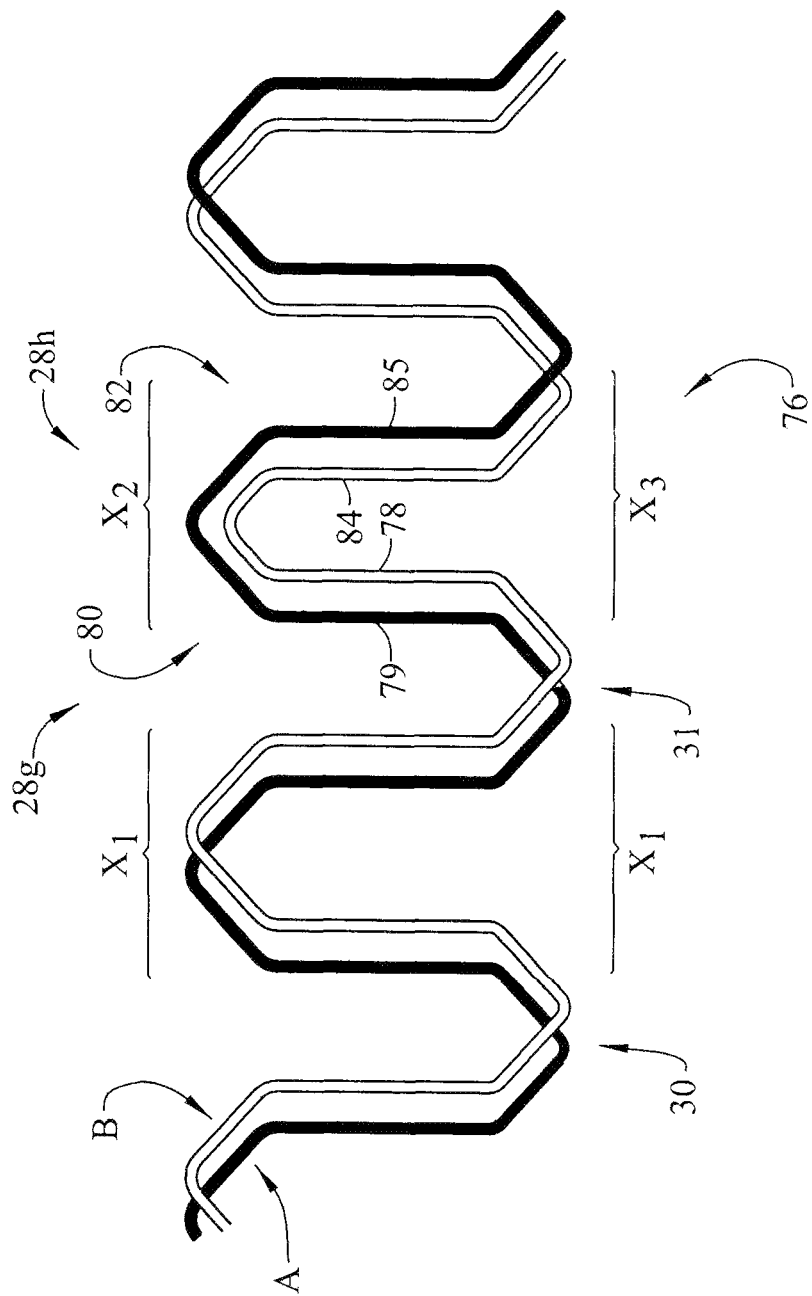
FIG. 4 depicts the first conductor weaving with the second conductor at an end loop crossing zone of the stator of FIG. 1, in accordance with an aspect of an exemplary embodiment.

This pattern of conductor A residing in layer 1 of slot N and conductor B residing in layer 1 of slot N+1 connected by end loops having a pitch N, continues up through pole 28h. From pole 28p up to pole 28g, the conductor A slot segments are to the left of conductor B slot segments and conductor B resides on top of conductor A at locations 30 and 31 (FIG. 4). Having the right conductor (up until this point conductor B) on top of the left conductor (up until this point conductor A) eases assembly and allows the end loops to nest together better.

In between pole 28g and pole 28h, an end loop (not shown) for conductor A extends from a slot segment slot 43 layer 1 of pole 28g to slot 50, layer 1 of pole 28h. This end loop has a pitch of seven or N+1. In between pole 28g and pole 28h an end loop (not shown) for conductor B extends from a slot segment slot 44 layer 1 of pole 28g to slot 49, layer 1 of pole 28h. This end loop has a pitch of five or N−1. The N−1 pitch end loop of conductor B and the N+1 end loop of conductor A causes conductor A to flip flop with conductor B and now for pole 28h, conductor A slot segment resides in the right slot and conductor B resides in the left slot. (As can best be seen in FIG. 2, the winding is phase shifted and the 16 conductors of one pole are distributed over 1 full slot and two half slots. It should be understood the term left slot and right slot refer to the right slot and left slot per layer—for example pole 28c; the left slot for layer 1 is slot 19 but the left slot of layer 5 is slot 20 and the right slot for layer 1 is slot 20 and the right slot of layer 5 is slot 21). It is still desirable to have the end loops nest properly and a conductor residing in a left slot must be behind a conductor residing in a right slot of a pole. Since conductor B is now resides in the left slot and conductor A resides in the right slot for pole 28h, the conductors A and B must be woven at this point to place the conductor B behind conductor A. This can best be seen in FIG. 4 where conductor A is behind conductor B at pole 28g but conductor B is behind conductor A at pole 28h.

The pattern of end loops connecting slot segments of conductor B in the layer 1 of the left slot and slot segments of conductor A in the layer 1 of the right slots, continues from pole 28h up through pole 28l. From poles 28m-28p, the end loops of conductor A and conductor B continue as end loops having a pitch of N but the end loops jog inwards causing the slot segments of conductor A and B to spiral inwards and residing in layer 1 of pole 28L to residing in layer 2 of pole 28m to residing in layer 3 of pole 28N, to residing in layer 4 of pole 28o to finally residing in layer 5 of pole 28p.

The wrap of conductors A and B in layer 5 continues from pole 28p to pole 28g, with conductor B slot segment residing in the left slot and conductor A residing in the right slot of each pole. For these poles 28p to pole 28g, slot segments of conductor A and conductor B reside in layer 5 and conductor B remains behind conductor A. In between pole 28g and pole 28h, an end loop (not shown) for conductor B connects a slot segment residing in slot 44 of layer 5 of pole 28g with a slot segment residing in slot 51 of layer 5 of pole 28h. This end loop has a pitch of seven or N+1. In between pole 28g and pole 28h an end loop (not shown) for conductor A connects a slot segment residing in slot 45 of layer 4 of pole 28g with a slot segment residing in slot 50 of layer 1 of pole 28h. This end loop has a pitch of five or N−1. The N−1 pitch end loop of conductor B and the N+1 end loop of conductor A causes conductor A to reside in the left slot and conductor B to reside in the right slot of pole 28h. Again, to improve nesting of the end loops, the two conductors A and B require a weave between pole 28g and 28h in layer 5 so conductor is B is behind conductor A at crossing zone 80 but conductor A is behind conductor B at crossing zone 88. This is opposite of shown in FIG. 4.

The pattern of end loops connecting slot segments of conductor A in the layer 5 of the left slot and slot segments of conductor B in the layer 5 of the right slots, continues from pole 28h up through pole 28l. From poles 28m-28p, the end loops of conductor A and conductor B continue as end loops having a pitch of N but the end loops jog inwards causing the slot segments of conductor A and B to spiral inwards and residing in layer 5 of pole 28L to residing in layer 6 of pole 28m to residing in layer 7 of pole 28N, to residing in layer 8 of pole 28o.

Like conductors A and B conductors A2 and B2 of phase 2 (not shown but are the same as conductors A and B except shifted 2 slots from conductors A and B) are woven together in a pair. Similarly, the conductors A3 and B3 (not shown but are the same as conductors A and B except shifted 4 slots form conductors A and B) are woven together in a pair. Similarly, woven pairs consist of conductors C and D, C2 and D2, C3 and D3, E and F, E2 and F2, E3 and F3, G and H, G2 and H2, G3 and H3.

The winding in FIG. 2 has been described after it has already been inserted into a stator core slots. However, before spiral insertion into the stator core the all of the conductors A-H must be nested together. To accomplish the nesting, the conductors are laid out flat and linearly without spiraling. In the flat linear state, conductors A and B are woven as previously described and then laid out linearly. Conductors A and B slot segments will reside all in a row 1 of the linear winding. A woven pair of conductors A2 and B2 (not shown but exactly like conductors A and B) of a second phase are laid on top of conductors A and B shifted two slots from conductors A and B. A woven pair of conductors A3 and B3 (not shown but exactly like conductors A and B) are laid on top of conductors A, B, A2 and B2 shifted 4 slots from conductors A and B.

The slot segments of conductors A, B, A2, B2, A3, B3 all reside in row 1 of the linear winding. A woven pair of conductors C and D are then laid linearly on top of conductors A-B3 shifted one pole from conductors A and B. The slot segments of conductors C and D reside in row 2 of the linear winding, except for the initial slot segments of pole 28o which reside in row 1 of the linear winding. These steps of loading woven pairs on top of the existing winding continues for woven conductor pairs C2 and D2, C3 and D3, E and F, E2 and F2, E3 and F3, G and H, G2 and H2, G3 and H3. The slot segments of conductors G, H, G2, H2, G3 and H3 all reside in row 4 of the linear winding—except for initial slot segments in poles 28*m* (row 1), 28*n* (row 2), 28*o* (row 3).

Reference will now follow to FIG. 3*a*, with continued reference to FIGS. 2*a* and 2*b*, in describing conductor A with an understanding that conductor C, conductor E, and conductor G are similarly formed. Conductor A includes a first plurality of bends 55*a*, 55*b*, and 55*c* having a first winding pitch X1, a bend 59 and a bend 60 having a second winding pitch X2, and a bend 62 having a third winding pitch X3. Plurality of bends 55*a*, bend 59, and bend 55*b* may define a first winding layer 64 (FIG. 2), bends 55*c*, bend 62, and bend 55*d* may define a second winding layer 65, and 60 may define a transition between first winding layer 65 and second winding layer 65. The number of winding layers per conductor may vary.

Reference will now follow to FIG. 3*b* in describing conductor B with an understanding that conductor D, conductor F, and conductor H are similarly formed. Conductor B includes a first plurality of bends 68*a*, 68*b*, and 68*c*, and 65*d* having the first winding pitch X1, a bend 71 and a bend 72 having the second winding pitch X2, and a bend 75 having the third winding pitch X3. Plurality of bends 68*a*, and bend 75 may define the first winding layer 64 (FIG. 2*a*), bends 68*c*, 68*d*, and bend 72 may define the second winding layer 65, and bend 72 may represent a transition between first winding layer 64 and second winding layer 65. The number of winding layers per conductor may vary.

In an embodiment, second winding pitch X2 is greater than first winding pitch X1, and third winding pitch X3 is greater than first winding pitch X1. Further, a change from the first winding pitch X1 to wither the second winding pitch X2 or the third winding pitch X3 occurs only once per winding layer at end loop crossing zones that exist between two adjacent poles as will be detailed herein. In accordance with an aspect of an exemplary embodiment, first winding pitch X1 may represent a six (6) pitch, second winding pitch X2 may represent a seven (7) winding pitch, and third winding pitch X3 may represent a five (5) pitch.

Reference will now follow to FIG. 4 in further describing a weave of conductor A and conductor B in first winding layer 64, in accordance with an exemplary embodiment. Conductor A may include a slot segment 78 that resides in one of the plurality of slots 22 defining pole 28*g*. Conductor B may include a slot segment 79 that resides in an adjacent one of the plurality of slots 22 defining pole 28*g*. A first end turn crossing zone 80 is defined just to the left of slot segment 78 and slot segment 79. At first end turn crossing zone 80, conductor B is on top of conductor A.

Conductor A may also include a slot segment 84 that resides in one of the plurality of slots 22 defining pole 28*h*. Conductor B may include a slot segment 85 that resides in an adjacent one of the plurality of slots 28*h*. A second end turn crossing zone 88 is defined just to the right of slot segment 84 and slot segment 85. Conductor A is weaved relative to conductor B in between first end turn crossing zone 80 and second end turn crossing zone 88. As a result, conductor A is on top of conductor B at second end turn crossing zone 88. In an embodiment, bend 75 having the third pitch winding X3 nests within bend 59 having the second pitch winding X2 thus creating a transition allowing conductor A to sit atop conductor B at second end turn crossing zone 88. The weaving of conductor A and conductor B promotes an electrical balance for stator 10 while the nesting of conductor A and conductor B reduce an overall radial thickness of the stator coil. As can be seen in FIG. 4, there are a series of consecutive crossing zones where conductor A is behind conductor B to the left of the end loops having the second and third winding pitches x2 and x3 and there is a series of consecutive crossing zones where conductor B is behind conductor A to the right of the end loops having the second and third winding pitches x2 and x3.

As discussed herein, the weave of conductor A and B for second winding layer 65 is the same as FIG. 4 except opposite in that conductor A is behind conductor B at crossing zone 80 and conductor B is behind conductor A at crossing zone 88. The remaining conductors are woven in pairs C and D; E and F; and G and H for the first phase and A2 and B2; C2 and D2; E2 and F2; and G2 and H2 for the second phase, and A3 and B3; C3 and D3; E3 and F3; and G3 and H3 for the third phase. Once the windings are laid in a linear winding as previously defined, the winding is spiraled into 2 wraps and inserted into the stator such that the almost first half of the winding has slot segments residing in layers 1-4, a set of transition slot segments at poles 28*n*, 28*n*, 28*o*, and 28*p* and the remaining almost half winding with slot segments residing in layers 5-8.

Conductors A and B spiral radially inwardly and are then formed into second layer 65 which includes corresponding end turn crossing zones at a different pole. Each additional conductor C-H is wound in stator 10 as shown in FIGS. 2*a* and 2*b* with each winding layer including corresponding end turn crossing zones that lead to an overall electrical balance and reduces thickness for stator 10.

The almost completed design has 8 conductors that each wrap around the lamination 2 times CW and therefore each wire has 2 electrical turns. The desire however is a balanced 4 turn stator. At this point the ends of two conductors are connected together by a reversing connection. This creates a stator having 4 conductors having 2 wraps (winding layers) in one direction and 2 more wraps (winding layers) in the opposite direction. Therefore, these conductors now have 4 electrical turns. Conductors may be connected in series such that the average position of the slot segments in the left CCW slots are the same. Same for middle slots. Same for right (CW) most slots. In an embodiment, conductor A may be connected serially to conductor H; conductor B may be connected serially to conductor G; conductor C may be connected serially to conductor F; and conductor E may be connected serially to conductor D. With these connections each conductor layer is slot and layer balanced in the left slot, middle slot and right slot of each pole 28A-28*i*.

The windings may then be are connected together as a delta winding or wye winding. The wye winding may have 4 separate neutrals by connecting the neutral end of conductor A together for phase U, V, and W, connecting the neutral end of conductor B together for phase U, V, W and so forth. The exemplary embodiment describes employs a 6 pitch winding with 5-7 pair pitch end loops and 7 pitch for phase shifting. However, it should be understood that the exemplary embodiment may also embody a winding having N pitches, N+1 and N−1 pair pitch end loops and N+1 (or N−1) pitch end loops for phase shifting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of forming a stator for an electric machine comprising:
    forming a first conductor into a plurality of bends having a first winding pitch;
    forming a second conductor into a plurality of bends having the first winding pitch;
    creating a winding layer of the stator by introducing the first conductor and the second conductor into a first pole of a stator having a first end loop crossing zone, wherein the second conductor is on top of the first conductor at the first end loop crossing zone;
    changing the winding pitch of the first conductor to a second winding pitch that is distinct from the first winding pitch;
    changing a winding pitch of the second conductor to a third winding pitch that is distinct from the first winding pitch and the second winding pitch;
    weaving the first conductor relative to the second conductor between the first pole and a second pole of the stator; and
    introducing the first conductor and the second conductor into the second pole of the stator having a second end loop crossing zone, wherein the first conductor is on top of the second conductor at the second end loop crossing zone.

2. The method of claim 1, wherein introducing the first conductor into the second pole include introducing the first conductor having bends formed therein at the first winding pitch.

3. The method of claim 2, wherein introducing the second conductor into the second pole include introducing the second conductor having bends formed therein at the first winding pitch.

4. The method of claim 1, wherein changing the pitch of the first conductor includes decreasing the pitch of the first conductor relative to the first winding pitch.

5. The method of claim 4, wherein changing the pitch of the second conductor includes increasing a pitch of the second conductor relative to the first winding pitch.

6. The method of claim 1, wherein weaving the first conductor relative to the second conductor occurs no more than one time per winding layer.

7. The method of claim 1, wherein forming the first conductor into a plurality of bends having the first winding pitch includes forming the plurality of bends of the first conductor with a six (6) pitch.

8. The method of claim 7, wherein changing the first winding pitch of the first conductor to the second winding pitch includes changing the plurality of bends of the first conductor to a five (5) pitch.

9. The method of claim 8, wherein changing the first winding pitch of the second conductor to the third winding pitch includes changing the plurality of bends of the second conductor to a seven (7) pitch.

10. The method of claim 1, further comprising: weaving the first conductor relative to the second conductor between a third pole and a fourth pole of the stator such that the second conductor is on top of the first conductor.

11. The method of claim 10, wherein weaving the first conductor relative to the second conductor between the third pole and the fourth pole occurs in another winding layer of the stator.

12. The method of claim 10, wherein weaving the first conductor relative to the second conductor between the third pole and the fourth pole includes weaving the first conductor relative to the second conductor in another winding layer of the first pole and the second pole.

13. The method of claim 1, wherein introducing the first conductor and the second conductor into the first pole of the stator includes maintaining the second conductor on top of the first conductor for at least two adjacent poles prior to the first end loop crossing zone.

14. The method of claim 13, wherein introducing the first conductor and the second conductor into the first pole of the stator includes forming the plurality of bends of the first conductor and the plurality of bends of the second conductor at the first winding pitch for at least two adjacent poles prior to the first end loop crossing zone.

15. The method of claim 1, wherein introducing the first conductor and the second conductor into the second pole of the stator includes maintaining the first conductor on top of the second conductor for at least two adjacent poles after the second end loop crossing zone.

16. The method of claim 15, wherein introducing the first conductor and the second conductor into the second pole of the stator includes forming the plurality of bends of the first conductor and the plurality of bends of the second conductor at the first winding pitch for at least two adjacent poles after the second end loop crossing zone.

17. The method of claim 1, wherein changing the winding pitch of the plurality of bends of the first conductor includes decreasing the first winding pitch of the plurality of bends of the first conductor between the first end loop crossing zone and the second end loop crossing zone.

18. The method of claim 1, wherein changing the winding pitch of the plurality of bends of the second conductor includes increasing the first winding pitch of the plurality of bends of the second conductor between the first end loop crossing zone and the second end loop crossing zone.

19. The method of claim 1, further comprising:
    forming a third conductor into a plurality of bends having a first winding pitch;
    forming a fourth conductor into a plurality of bends having the first winding pitch;
    introducing the third conductor and the fourth conductor into the first pole of the stator, wherein the fourth conductor is on top of the second conductor at the first end loop crossing zone;
    changing the pitch of the third conductor to the second winding pitch that is distinct from the first winding pitch;

changing the pitch of the second conductor to the third winding pitch that is distinct from the first winding pitch and the second winding pitch;

weaving the third conductor relative to the fourth conductor between the first pole and the second pole of the stator; and introducing the third conductor and the fourth conductor into the second pole of the stator, wherein the third conductor is on top of the fourth conductor at the second end loop crossing zone.

\* \* \* \* \*